Sept. 15, 1964 G. E. COLE ETAL 3,148,893
FIFTH WHEEL
Filed Nov. 21, 1962 2 Sheets-Sheet 2
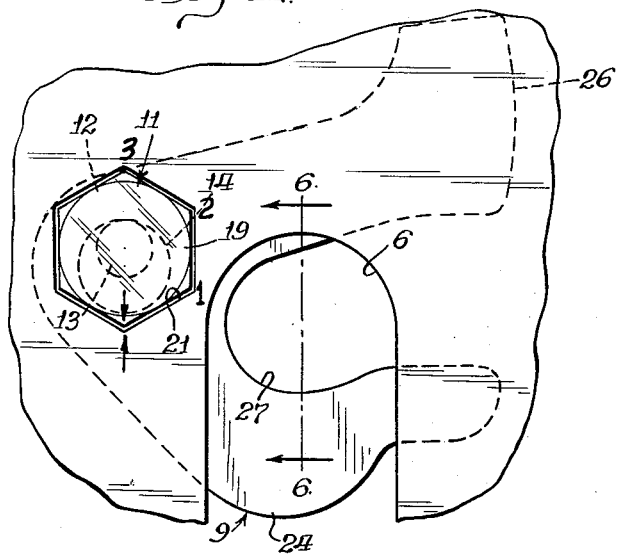
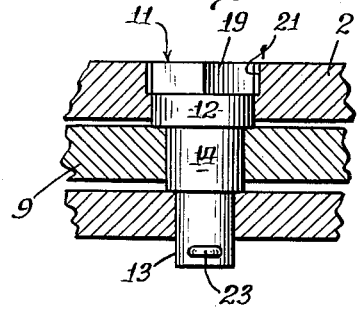
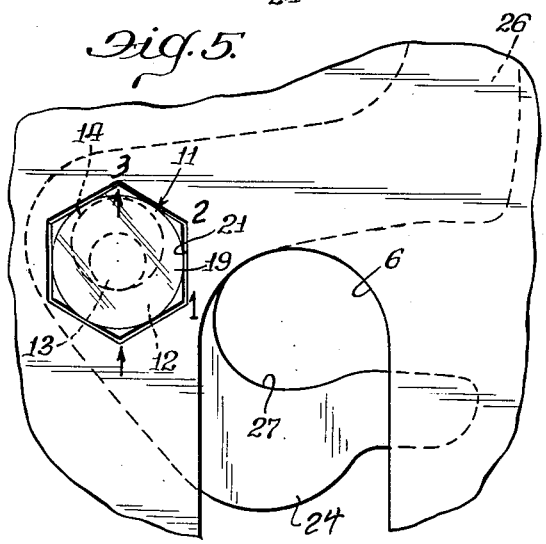
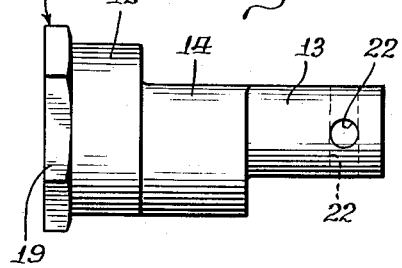
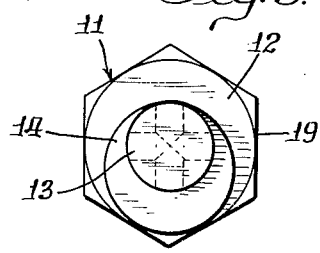
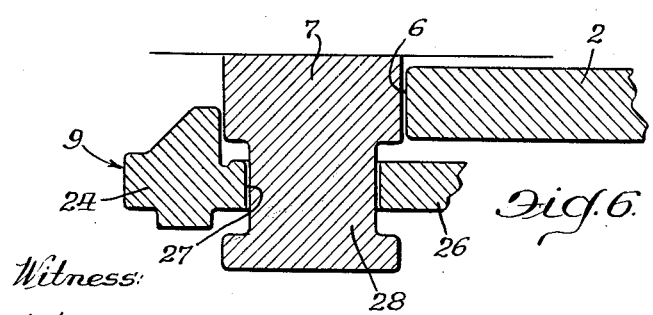
INVENTORS.
Gordon E. Cole
John A. Kent
By Walter J. Schlegel Jr. Atty.
Witness:
C. H. Bassett United States Patent Office 3,148,893
Patented Sept. 15, 1964

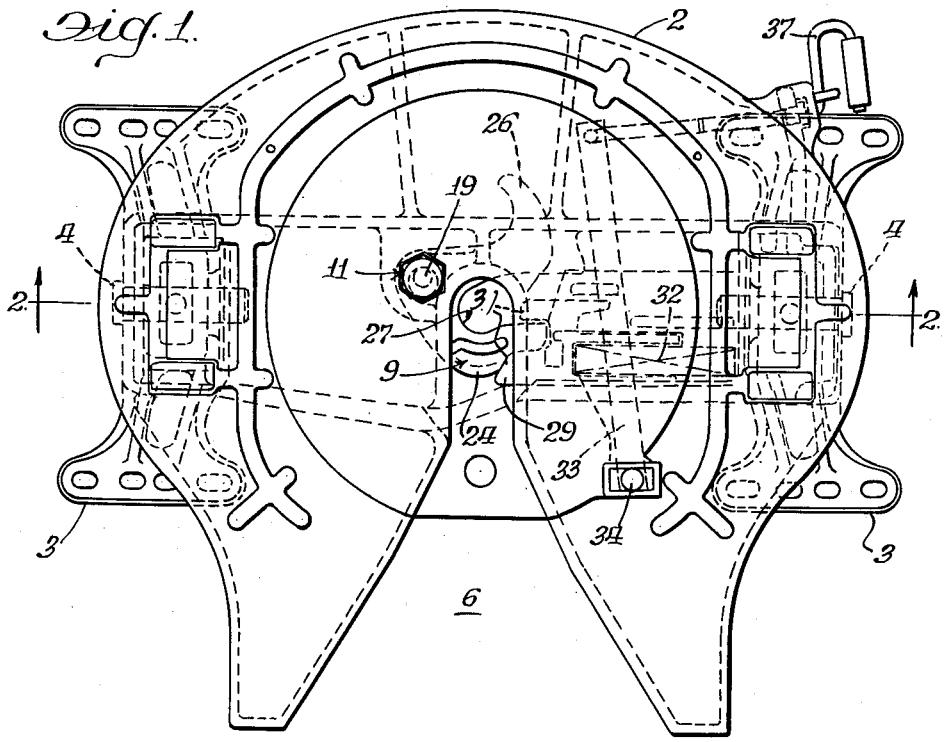
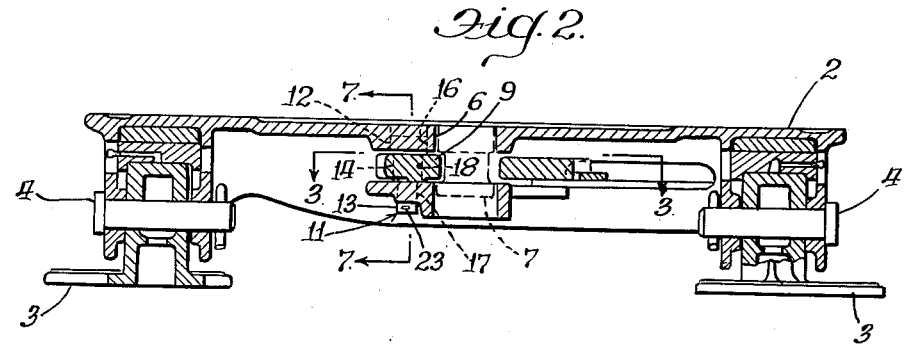
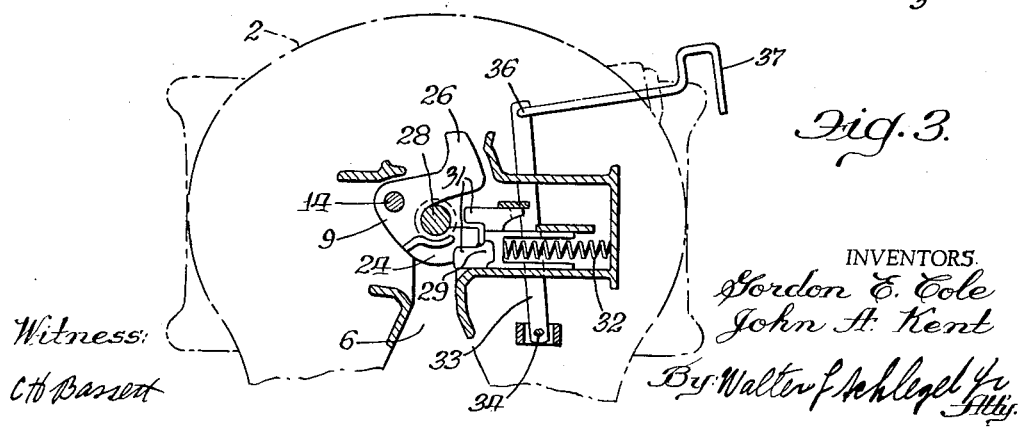

1

3,148,893
FIFTH WHEEL
Gordon Estes Cole, Hazelcrest, Ill., and John Allan Kent, Chesterton, Ind., assignors to Amsted Industries Incorporated, Chicago, Ill., a corporation of New Jersey
Filed Nov. 21, 1962, Ser. No. 239,308
4 Claims. (Cl. 280—434)

This invention relates to fifth wheel coupling devices of the type provided on highway tractors for detachable engagement with kingpins provided on trailers, and is more particularly concerned with the provision of improvements in a fifth wheel coupling device of the type shown and described in United States Patent No. 2,861,818 issued November 25, 1958, to Kayler et al., which is incorporated herein by reference.

The present invention contemplates improvements in a fifth wheel coupling device comprising a wheel plate formed with a slot to receive a trailer kingpin, and a coupling jaw pivotally mounted on the lower side of the plate to engage and lock the kingpin to the plate. During operation of tractor-trailers, the fifth wheel parts provided to engage the kingpin, as disclosed in the above-mentioned patent, may become worn and permit excessive movement of the kingpin relative to the wheel plate. It is, therefore, an object of the invention to provide a fifth wheel coupling device adapted to be adjusted to compensate for wear of the parts engaging the kingpin.

Another object of the invention resides in the provision of a fifth wheel coupling device in which the coupling jaw is mounted for pivotal movement on an eccentric journal portion of a rotatably adjustable pin provided on the wheel plate.

A further object of the invention resides in the provision of an adjustment pin having a hexagonal head engaged in a hexagonal opening formed in the wheel plate, whereby the pin is adapted to be manually raised, rotated and secured in an adjusted position to reduce clearance between the kingpin and the parts of the fifth wheel engaging the kingpin.

The invention embodies other novel features, details of construction and arrangement of parts which are hereinafter set forth in the specification and claims and illustrated in the accompanying drawings forming part thereof, wherein:

FIGURE 1 is a top plan view showing a fifth wheel embodying features of the invention.

FIGURE 2 is a transverse section taken along the line 2—2 of FIGURE 1.

FIGURE 3 is a fragmentary section taken along the line 3—3 of FIGURE 2.

FIGURE 4 is an enlarged fragmentary plan view illustrating the coupler jaw and pivot adjustment pin in their first positions.

FIGURE 5 is a plan view, corresponding to FIGURE 4, showing the coupler jaw and pivot pin in an adjusted position to compensate for wear of parts engaging the kingpin.

FIGURE 6 is a fragmentary section taken along the line 6—6 of FIGURE 4.

FIGURE 7 is a fragmentary section taken along the line 7—7 of FIGURE 4.

FIGURES 8 and 9 are detail side and end elevations, respectively, showing the adjustment pin.

Referring now to the drawings for a better understanding of the invention, the fifth wheel is shown as comprising a wheel plate 2 pivotally connected at opposite sides thereof to brackets 3 by means of pivot pins 4. The brackets 3 are adapted to be secured to the frame of a highway tractor by means of bolts or screws. The wheel plate 2 is formed with an inwardly converging slot 6 adapted to receive a kingpin 7 secured to a trailer.

A coupling jaw 9 is pivotally mounted on the underside of the wheel plate 2 by means of a pivot pin 11 formed with coaxial end portions 12 and 13 and an eccentric intermediate portion 14. As illustrated in FIGURE 2, the end portions 12 and 13 are engaged in spaced coaxial apertures 16 and 17, respectively, formed in the wheel plate; and the eccentric intermediate portion 14 extends through an opening 18 formed in the coupling jaw 9. The pin 11 is formed with a hexagonal head portion 19 engaged in a hexagonal opening 21 formed in the wheel plate; and the end portion 13 is formed with transverse openings 22 to receive a cotter pin 23.

The coupling jaw 9 is formed with a locking arm 24 spaced from a tail 26 to define a recess 27 to receive the neck portion 28 of the kingpin 7. A lock 29 is mounted for reciprocative movement along the underside of the wheel plate 2 and formed at its inner end with spaced lips 31 to receive the end of the locking arm 24 therebetween to secure the coupling jaw in its locked position. A compression spring 32 is provided to yieldably resist movement of the lock 29 from its locked position toward its retracted unlocked position.

A lock bar 33 has one end thereof pivotally mounted at 34 to the underside of the wheel plate 2. The bar 33 extends through a slot in the lock 29 and has its free end pivotally connected at 36 to the inner end of an operating handle 37 slidably mounted in an opening formed in the wheel plate 2.

In operation, the lock 29 engages the end of the locking arm 24 to prevent pivotal movement of the coupling jaw 9 when the kingpin 7 is engaged in the recess 6 of the wheel plate 2.

When a trailer is to be uncoupled from the tractor, the operator moves the handle 37 outwardly to cause the bar 33 to retract the lock 29 to disengage the lips 31 from the end of the locking arm 24 to permit the coupling jaw to pivot to its open position.

After the fifth wheel has been in use for a relatively long period of time, the portions of the fifth wheel employed to snugly engage the kingpin become worn. To adjust parts of the fifth wheel to compensate for such wear, the pivot pin 11 is moved in a counterclockwise direction, as viewed in FIGURES 1, 4 and 5, to cause the eccentric portion 14 of the pin to move the locking arm 24 toward the inner end of the recess 6.

We claim:
1. In a fifth wheel adapted to be mounted on a tractor to detachably engage a kingpin on a trailer, a wheel plate having a recess to receive the kingpin, a clamping jaw mounted pivotally on the wheel plate to retain the kingpin in said recess, and means to adjust the axis of pivotal movement of the clamping jaw on said plate to compensate for wear of those portions of the wheel plate and clamping jaw in contact with the kingpin, said means comprising a rotatably adjustable pivot pin mounted on the wheel plate and having an eccentric journal portion engaging the clamping jaw for pivotal movement, said pin having a non-circular head engaged in a non-circular opening provided in the wheel plate.

2. In a fifth wheel adapted to be mounted on a tractor to detachably engage a kingpin on a trailer, a wheel plate having a recess to receive the kingpin, a clamping jaw pivotally mounted on the wheel plate to retain the kingpin in said recess, and means to adjust the axis of pivotal movement of the clamping jaw on said plate to compensate for wear of those portions of the wheel plate and clamping jaw in contact with the kingpin, said means comprising a rotatably adjustable pivot pin having coaxial end portions mounted in openings in the wheel plate, and an intermediate journal portion eccentric to the end portions to engage the clamping jaw for pivotal movement, said pin having a non-circular head engaged in a non-circular opening provided in the wheel plate.

3. In a fifth wheel adapted to be mounted on a tractor to detachably engage a kingpin on a trailer, a wheel plate having a recess to receive the kingpin, a clamping jaw pivotally mounted on the wheel plate and having spaced arms to straddle and engage the kingpin in said recess, a lock on said wheel plate to lock said clamping jaw in fixed position, and means to adjust the axis of pivotal movement of said clamping jaw relative to the inner end of said recess, said means comprising a pivot pin rotatably adjustable on the wheel plate and having an eccentric journal portion engaging the clamping jaw for pivotal movement, said pin having a non-circular head engaged in a non-circular opening provided in the wheel plate.

4. In a fifth wheel adapted to be mounted on a tractor to detachably engage a kingpin on a trailer, a wheel plate having a recess to receive the kingpin, a clamping jaw pivotally mounted on the wheel plate and having spaced arms to straddle and engage the kingpin in said recess, a lock on said wheel plate to lock said clamping jaw in fixed position, and means to adjust the axis of pivotal movement of said clamping jaw relative to the inner end of said recess, said means comprising a pivot pin rotatably adjustable on the wheel plate and having an eccentric journal portion engaging the clamping jaw for pivotal movement, said pivot pin having a head engaged for axial and non-rotational movement in an opening formed in the wheel plate.

References Cited in the file of this patent

UNITED STATES PATENTS

| | | |
|---|---|---|
| 582,071 | Little | May 4, 1897 |
| 1,566,375 | Coatalen | Dec. 22, 1925 |
| 1,580,735 | Johnson | Apr. 13, 1926 |
| 2,861,818 | Kayler et al. | Nov. 25, 1958 |
| 3,034,805 | Becker | May 15, 1962 |